Feb. 10, 1931.  C. H. MORROW  1,791,509
BURNER
Filed June 6, 1928
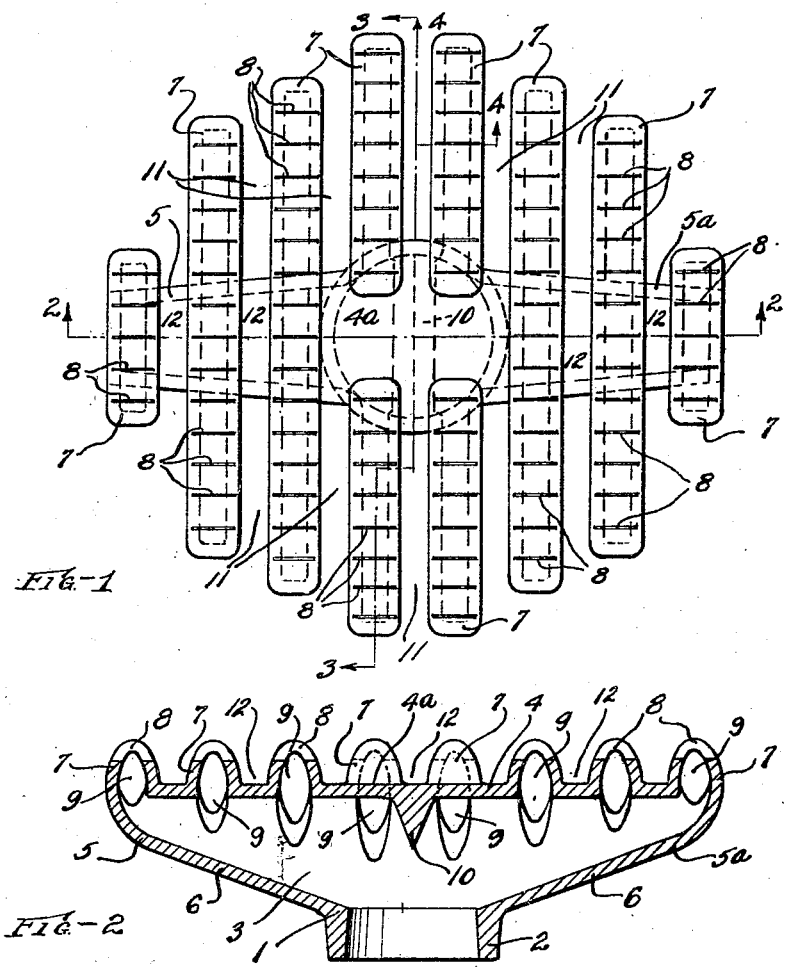
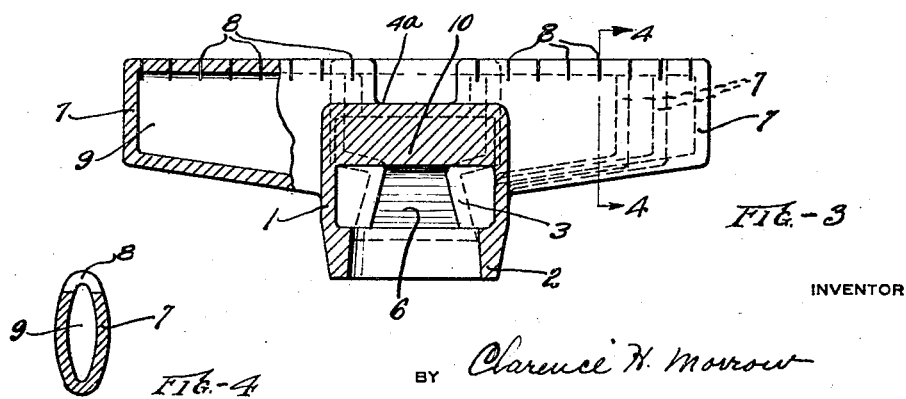
INVENTOR
BY Clarence H. Morrow
Brockett & Hyde
ATTORNEYS Patented Feb. 10, 1931

1,791,509

UNITED STATES PATENT OFFICE

CLARENCE H. MORROW, OF CLEVELAND, OHIO, ASSIGNOR TO THE HOTSTREAM HEATER COMPANY, OF CLEVELAND, OHIO, A CORPORATION OF OHIO

BURNER

Application filed June 6, 1928. Serial No. 283,436.

This invention relates to gas burners such as are used beneath the heating elements or coils of domestic water heaters or in like places.

The object of the invention is to provide an improved burner which can be made at very low cost and by simple operations, and particularly in which the jet orifices may be produced by a sawing operation, enabling all of them to be produced at one operation if desired, and wherein also the arrangement is such as to uniformly distribute the gas to all portions of the burner and provide for a proper air supply, to thereby produce a uniform flame condition over the full area of the burner.

Further objects of the invention are in part obvious and in part will appear more in detail hereinafter.

In the drawings, which represent one suitable embodiment of the invention, Fig. 1 is a plan view; Fig. 2 is a cross section on the line 2—2, Fig. 1; Fig. 3 is a cross section on the line 3—3, Fig. 1; and Fig. 4 is a detail cross section on the line 4—4, Fig. 1.

The burner shown in the drawings for purposes of illustration is a single unit in the sense that all of its parts are comprised within the same cored casting, although it may be otherwise formed and is not limited to such construction. The burner shown includes a hollow or chambered body portion 1 suitably arranged for connection to the gas and air mixer or source of supply and is shown as provided with the customary cylindrical sleeve or neck 2 to be slipped over the mixer (not shown). The opening through said neck communicates with an ample chamber 3 within the casting, which has an upper horizontal wall 4 against which the rising gas, or mixture of gas and air, as the case may be, impinges. This chamber extends out laterally within two alined extensions or headers 5, 5a, which are alike, each of them being more or less of rectangular form in sectional elevation, as shown in Fig. 3, but of reduced cross section outwardly because the bottom wall 6 slopes upwardly. This provides for a graduated gas supply with reduced volume outwardly.

The body also includes a series of parallel arms 7, varying in length, as shown in Fig. 1, from the short end arms to the longer ones near the central vertical axis, all of said arms extending transversely to the length of the header members 5, 5a, and communicating with the chamber therein. Where they cross the headers the upwardly and acutely arched or convex parts of the arms form parts of the upper wall of said chamber. Each arm is generally of the cross section shown in Fig. 4, being of arched or rounded form, more or less elliptical or oval, with the long axis of the ellipse or oval vertical. Consequently, a vertical saw cut 8 made with the plane of the saw transverse to the length of the arm, increasingly opens or exposes the channel 9 within the arm as the depth of the cut increases, and the effective area of the orifice formed by the saw cut may be increased by an increased depth of cut. The saw cuts in the several arms may be formed at a single operation by a gang saw having a series of rotating blades secured on the same shaft. This rotating gang saw is passed across the arms in a horizontal direction to produce like cuts in all arms where the saw blades contact with them. The saw cuts should be properly spaced at intervals along the arms to separate the jets and permit proper air supply to the space between jets, and the depth of cut should be just sufficient to provide a proper distribution of the gas supplied through the neck 1 to all parts of the burner. For the latter purpose it is also preferable to avoid saw cuts or orifices in the zone of the burner directly above the entrance neck 2. Therefore the arched jet forming arms which otherwise would cross this zone have their central portions omitted, to form a continuous, flat imperforate wall portion 4a in the zone above the central inlet. This arrangement avoids the direct flow of gas from the inlet out through orifices which would lie directly above it and enables the gas to be deflected laterally and to reduce its velocity before it reaches and leaves any orifice, improving gas distribution. Also, to further assist in distribution the flat wall 4a may be provided with a deflector member 10, Fig. 2, which is of V-form with its edge directed downwardly and extending in the same direction as the several arms 7. This knife edge tends to divide the gas stream and direct half one way and half the other.

Reference to Fig. 1 shows that between each pair of neighboring arms there is an open space or channel 11. Where the arms extend outwardly beyond the lateral headers there is therefore a full and complete air supply to all jets on neighboring arms. Where the arched top portions of the arms extend across or above the headers 5, 5a, depressed channels or recesses 12 are formed between them, which also serve to conduct air to the jet orifices above the headers.

The result of this construction is a burner in which gas distribution is uniform, where distribution is proportional to the gas supplied, and the whole burner produces a flat circular frame co-extensive with its area and of uniform efficiency throughout.

What I claim is:

1. A gas burner, comprising a hollow chambered body portion having a gas connection and provided with a horizontal upper wall, spaced parallel hollow arms extending outwardly from said body portion, each arm having a channel communicating with said chamber, the channels being of generally elliptical cross section with the major axis vertical, and said channels all extending to the same level above said upper wall, the several arms being slotted transversely by parallel saw kerfs to a depth short of said wall, to thereby open up jet apertures from said channels, the areas of said apertures depending upon the depth of the saw kerf.

2. A gas burner of the form described in claim 1, in which the outer ones of said arms extend across the body portion and the central part of the body portion is imperforate, and the gas connection to said body portion is along a vertical line beneath said imperforate portion.

3. A gas burner of the form described in claim 1, in which the outer ones of said arms extend across the body portion and the central part of the body portion is imperforate, and the gas connection to said body portion is along a vertical line beneath said imperforate portion, and said imperforate body portion within said chamber is provided with a depending deflector to divide the gas stream and direct the same outwardly.

In testimony whereof I hereby affix my signature.

CLARENCE H. MORROW.